June 10, 1924.  1,497,268
H. P. HALL
CARRIAGE FOR SELF ACTING MULES
Filed Feb. 22, 1921    5 Sheets-Sheet 1

Inventor:-
Henry Platt Hall
By his Attorneys:-

June 10, 1924.

H. P. HALL 1,497,268

CARRIAGE FOR SELF ACTING MULES

Filed Feb. 22, 1921

5 Sheets-Sheet 5

Inventor
Henry Platt Hall

By his Attorneys:-

Patented June 10, 1924.

1,497,268

UNITED STATES PATENT OFFICE.

HENRY PLATT HALL, OF OLDHAM, ENGLAND.

CARRIAGE FOR SELF-ACTING MULES.

Application filed February 22, 1921. Serial No. 446,985.

*To all whom it may concern:*

Be it known that I, HENRY PLATT HALL, a subject of the King of the United Kingdom of Great Britain and Ireland, and resident of "Toravon" Werneth, Oldham, in the county of Lancaster, England, have invented new and useful Improvements in Carriages for Self-Acting Mules, of which the following is a specification.

This invention relates to devices to be used in carriages for self acting mules constructed wholly or in great part of steel or other metal plate or sheet for securing sections of such carriages one to another or to the squares to which they are to be connected or to end plates to be provided on the carriages and consists in coupling devices for that purpose which are simpler and easier in application and afford more rigid and substantial connection between sections or sections and squares or sections and end plates than the devices heretofore provided for the like purpose.

To afford the advantages indicated, coupling devices provided according to this invention are formed as right angled flanged attaching parts presenting only longitudinal bearing faces and having the two outer bounding faces at right angles for one to bear against the section to which the attaching part is riveted and the other to bear against a part for connection with the said section. The flanged attaching parts have holes for rivets and bolts. The coupling devices are applied so as to enable one section of a carriage to be coupled to another adjoining it or a section to be attached to the square of a self-acting mule or twiner or a section to form the end of a carriage remote from the square to be adapted to have an end plate secured to it.

Figure 1:
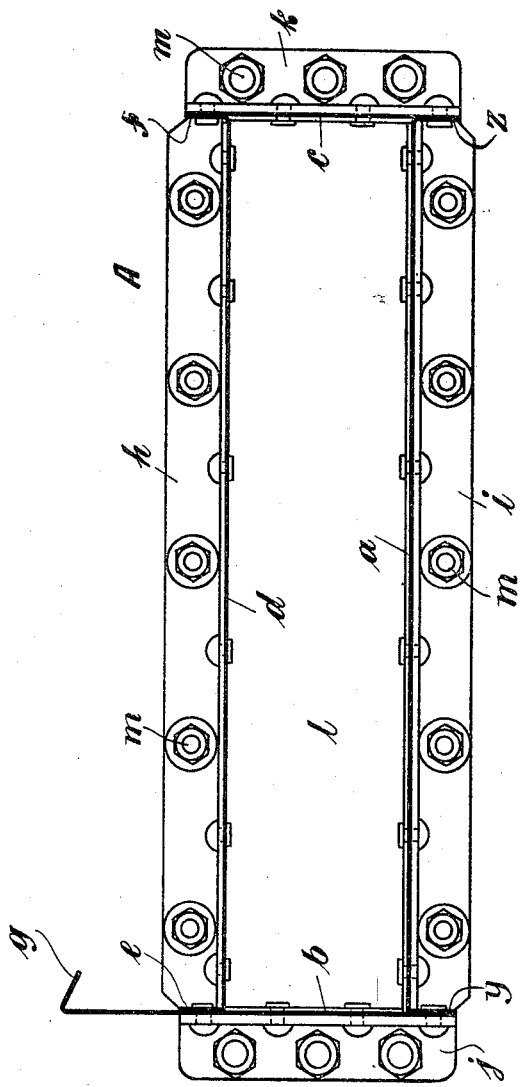
Figure 2:
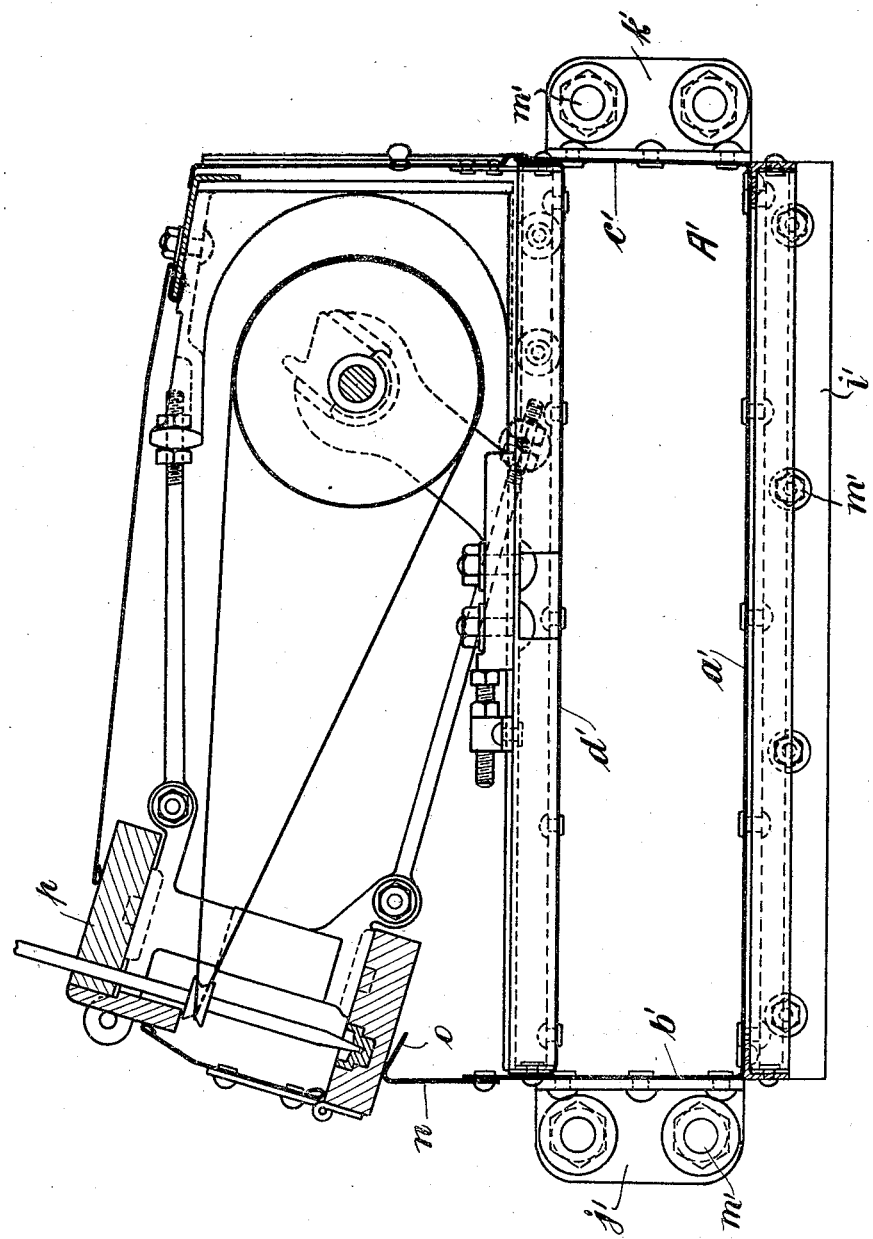
Figure 3:
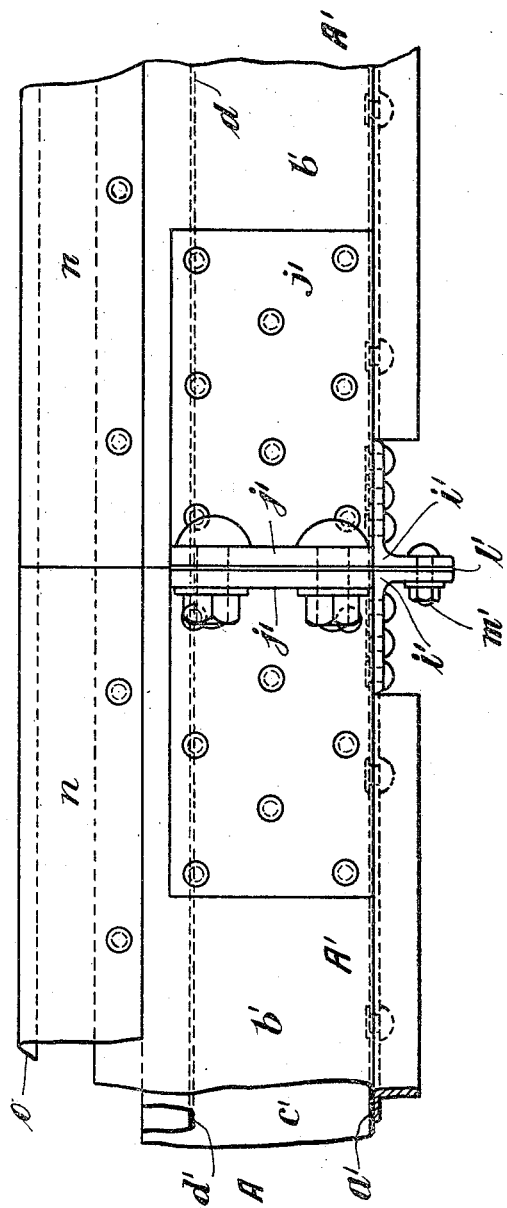

In the accompanying drawings, Fig. 1 is a transverse section through part of a carriage for a self acting mule formed as a continuous box girder as described in the specification of my copending application No. 446,986 filed February 22nd 1921, and illustrates the application of angle plates at the top and bottom of a section of the carriage and flanged brackets at the front and rear of the section. Fig. 2 is a transverse section through part of the carriage of a self acting mule also like that illustrated in Fig. 1 formed as a continuous box girder as described in the specification of the said application No. 446,986 and illustrating the application of angle plates at the bottom of a section of the carriage and flanged brackets at the front and rear and Fig. 3 is a front elevation illustrating parts at or near the junction of two sections or portions of the length of the carriage.

Figure 4:
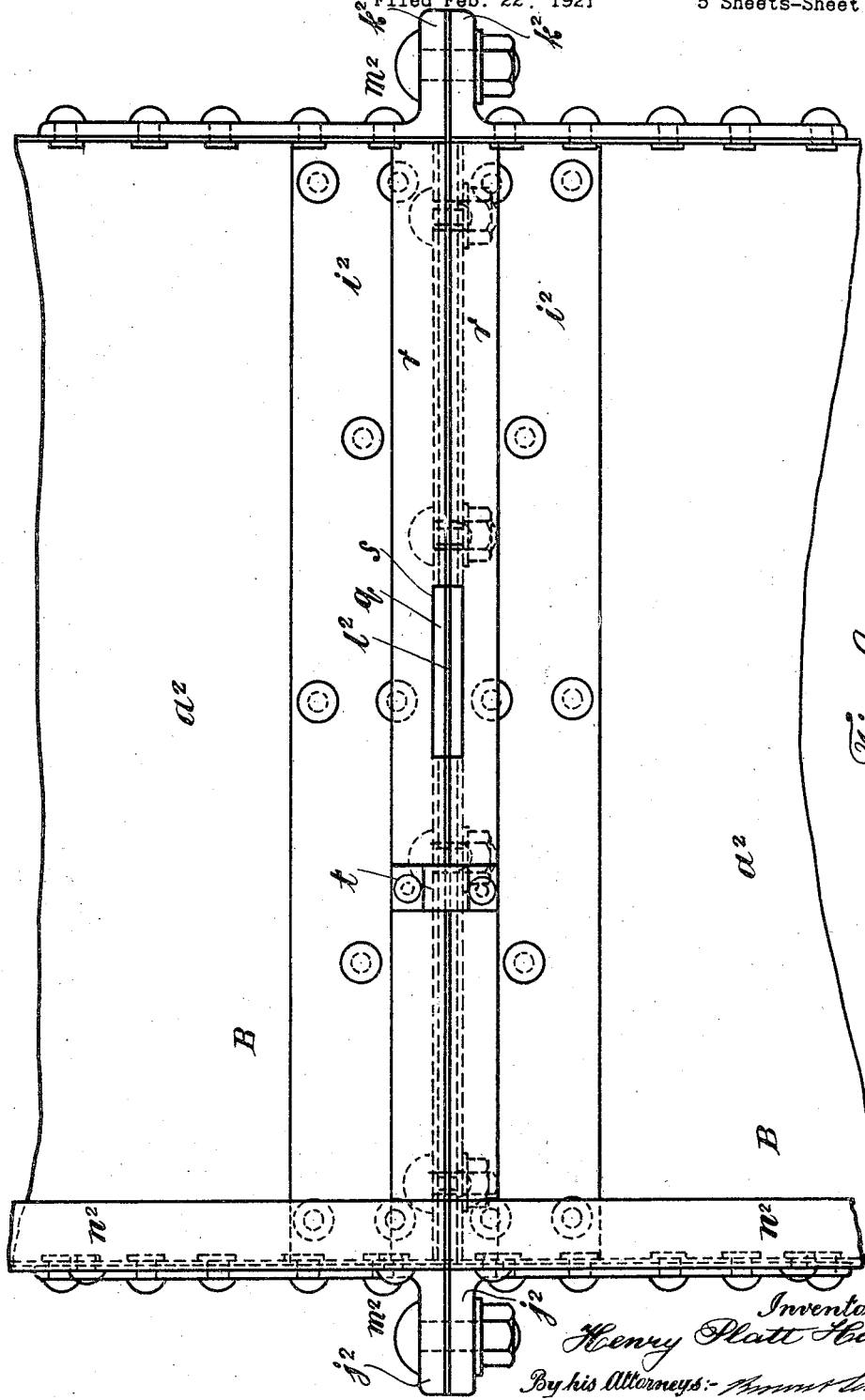
Figure 5:
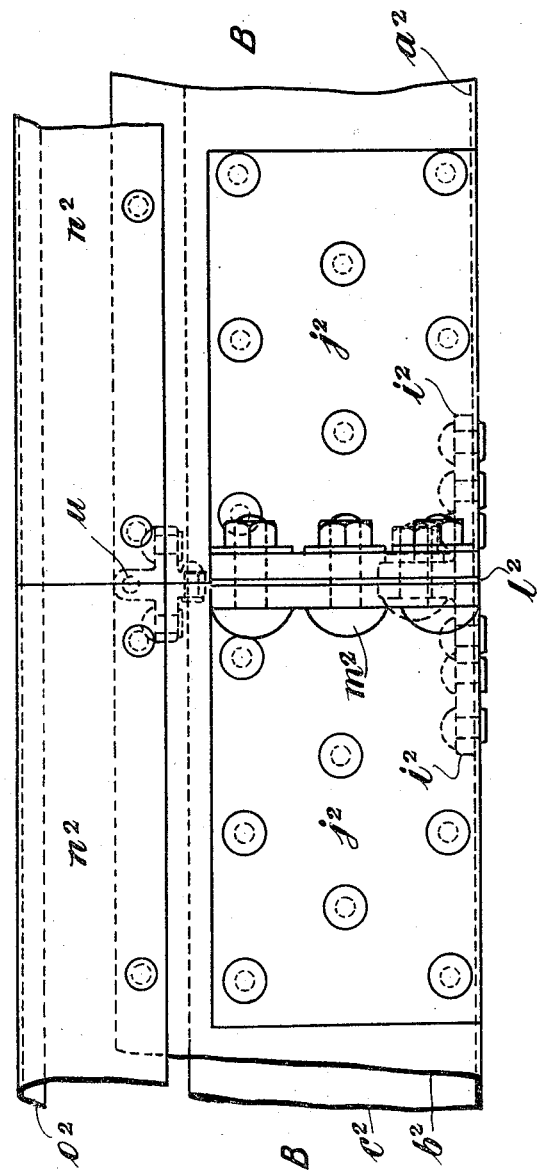

Fig. 4 is a plan and Fig. 5 is a front elevation of part of the carriage for a self acting mule formed of steel or other metal plate bent into channel shape and provided at the front with a plate or sheet comprising a vertical part and a rearwardly directed inclined flange for the support of the spindle rail or spindle box as described in the specification of my copending application No. 446,987 filed February 22nd 1921.

The same letters of reference are employed to indicate corresponding parts in different figures.

The mule carriage, part of which is shown in Fig. 1, is formed in sections or lengths A one only of which is shown and which is formed of a lower steel or other metal plate or sheet bent to form the bottom *a* and to provide downwardly turned flanges *v z* to which are riveted plates *b, c,* forming the front and rear walls of the section and an upper steel or other metal plate or sheet bent to form the top *d* of the section and upwardly turned flanges *e, f,* at the front and rear riveted to the front *b* and back *c* of the section.

In Fig. 1, one end only of the section A represented is shown and the front *b* is shown as extending upwards beyond the top *d* and provided with a rearwardly inclined flange *g* to form a rest for the spindle rail or spindle box of the carriage as described in the specification of the aforesaid application No. 446,986.

Externally on each end of the top *d*, as in the case of the end shown, a flanged plate *h* is riveted by one flange so as to present the outer face of the other flange extending upwardly from the section in the same plane as the adjacent ends of the sheets or plates forming the bottom *a*, front *b*, back *c*, and top *d*, of the section and similarly externally on each end of the bottom *a* a flanged plate *i* is riveted by one flange so as to present the outer face of the other flange extending downwardly from the section in the same plane as the outer face of the flanged plate *h* at the same end of the section. In like manner also each end of the front *b* of the section is provided externally with a flanged bracket $j$ riveted upon it by one flange so as to present the outer face of the other flange extending forwardly from the section in the same plane as the outer faces of the flanged plates $h, i$, at the same end of the section and each end of the back $c$ of the section is provided externally with a flanged bracket $k$ riveted upon it by one flange so as to present the outer face of the other flange extending in the same plane as the outer faces of the flanged plates $h, i$, and flanged bracket $j$ at the same end of the section.

In connection of the section A to another similar section, a steel or other plate $l$ is shown as provided to extend from front to rear between the meeting faces of the sections and shaped to correspond with the outline presented by the outer edges of the flanged plates $h, i$, and brackets $j, k$, at the meeting faces of the sections and bolts $m$ are passed through holes in the pairs of flanged plates $h, h, i, i$, and flanged brackets $j, j, k, k$, and the interposed plate $l$ and nuts being applied upon the bolts $m$, and being tightened the two sections are firmly coupled together and stiffened by the plate $l$.

In the construction shown in Fig. 2 which shows one end of a section of a carriage and Fig. 3 which shows the connected ends of two sections, the sections each formed of a lower steel or other metal plate bent to form the bottom $a'$ and to present upwardly turned flanges at the front and rear to form the front wall $b'$ and rear wall $c'$ of the section A' and an upper steel or other metal plate bent to form the top $d'$ of the section A' and to present upwardly turned flanges at the front and rear which are riveted to the front and rear walls $b', c'$ and the sections A' are provided with plates $n$ riveted to the fronts of the sections and extending above them and formed with flanges $o$ inclined downwards towards the rear of the carriage to form rests for the spindle rail or spindle box $p$ as described in the specifications of the aforesaid application No. 446986 and application No. 446984 filed February 22nd 1921 so that if there be occasion the plates $n$ can be removed for the substitution of others in order that the inclination of the spindles may be changed or spindles of different length may be used.

The sections A', A', indicated in Figs. 2 and 3 are provided externally on the bottom with flanged plates $i'$ and on the front and externally back with flanged brackets $j', k'$, riveted upon them and with a plate $l'$ interposed between them and are connected by bolts $m'$ similarly to the section A illustrated by Fig. 1 but the tops $d'$ are without flanged plates corresponding to the flanged plates $h$ mentioned in reference to Fig. 1 and the plate $l'$ is made of a form corresponding to the outline presented by the outer edges of the meeting faces of the flanged plate $i'$ the brackets $j', k'$, and the tops $d'$ of the sections A', A'.

In the construction shown in Figs. 2 and 3 the plates $n$ and parts of the fronts $b'$ of the sections A' above the upper edge of the plate $l'$ are extended over the plate $l'$ so as to meet when the sections are connected together.

In the construction shown in Figs. 4 and 5 which show the connected ends of two sections, the sections B each formed of a plate or sheet bent to form a bottom $a^2$, front $b^2$ and back $c^2$ being provided with plates $n^2$ having flanges $o^2$ similar to the plates $n$ shown in Figs. 2 and 3 are provided externally on the front and back with flanged brackets $j^2, k^2$, similarly to those shown in Figs. 2 and 3 but the flanged plates $i^2$ provided on the bottoms $a^2$ of the sections B are secured on the upper or inner faces of the bottoms $a^2$ instead of on the lower or outer faces thereof as in Figs. 1, 2, and 3 and while the plates $n^2$ and the fronts $b^2$ of the sections B are formed to extend over the plate $l^2$, interposed between the meeting faces of the sections B and the brackets $j^2, k^2$, and flanged plates $i^2$, the plate $l^2$, is made to extend a little above the backs $c^2$ of the sections B so that it may present an upper edge straight except for a gap $q$ near the centre and for the rest is made to conform in outline with the outer edges of the parts of the sections B, and the brackets $j^2, k^2$, and flanged plates $i^2$ between which it is placed. Bolts $m^2$ with nuts are employed to connect the sections B B as already described herein.

Along the upper edge of the plate $l^2$ on each of the two faces are riveted angle bars $r$ each with a gap in one flange at the part to be opposite the gap $q$ in the plate $l^2$ so that a slot $s$ is formed for the passage of bolts for securing a bearing bracket for the tin roller and a bracket $t$ riveted to the angle bars $r$ is formed with a hole $u$ for the passage of a screw for adjusting that bearing bracket lengthwise of the angle bars $r$.

In the connection of sections of carriages for self acting mules provided with right angled metallic attaching parts according to this invention for example with flanged plates $h, i$, and flanged brackets $j, k$, as shewn in Fig. 1 or with flanged plates $i'$ and flanged brackets $j', k'$, as shown in Figs. 2 and 3 or with flanged plates $i^2$ and flanged brackets $j^2, k^2$ as shown in Figs. 4 and 5 to squares with which they are to be used or to end plates with which they are to be provided at the outer ends of mule carriages, the flanged plates $h, i$, and flanged brackets $j, k$, or flanged plate $i'$, and flanged brackets $j', k'$, or flanged plates $i^2$ and flanged brackets $j^2, k^2$ as the case may be are bolted to the square or to the end plates which are formed with holes to be opposite to them in the plates or brackets to be applied to them but the right angled attaching parts to be bolted to a square may be made to present longer faces to and riveted over a greater length to sections than the other similar parts, thus being advantageous in stiffening and strengthening the sections next to the squares.

According to the construction of the sections of self acting mule carriages with which they are used the right angled attaching parts may be applied at the top and bottom, at the front and rear, at the top and bottom and front and rear or at the top or bottom and front or rear or front and rear at the top and bottom and front or rear to present holes formed in their flanges opposite to holes in the flanges of similar angle plates or brackets or angle plate or plates and bracket or brackets on the section or in the square to which it is to be joined or end plate to be joined to it. If a section when completed should comprise a top plate riveted to it as in the cases shown in Figs. 1, 2 and 3 the angle plates on the bottom of the section may be riveted thereto before the top plate is riveted in position.

A steel or other plate to extend from front to rear between the meeting faces of sections to be joined together may be provided, if considered desirable, to add rigidity to the completed carriage or to carry other parts and be secured in position by the bolts securing the sections together or such a plate may be omitted.

What I do claim as my invention and deside to secure by Letters Patent is:—

1. In a sheet metal self acting mule carriage, a section of the carriage and right angled flanged attaching parts each having holes for rivets and bolts riveted at each end of such section and presenting only longitudinal bearing faces and having the two outer bounding faces at right angles for one to bear against the said section and the other to bear against a part for connection with said section, bolts passed through holes in said attaching parts and nuts thereon.

2. In a sheet metal self acting mule carriage, a section of the carriage, and right angled flanged attaching parts each having holes for bolts and rivets riveted externally at each end of such section and each presenting only longitudinal bearing faces and having the two outer bounding faces at right angles for one to bear against the said section and the other to bear against a part for connection with such section, bolts passed through holes in said attaching parts and nuts thereon.

3. In a sheet metal self acting mule carriage, a section of a plurality of right angled flanged attaching parts with holes for rivets and bolts riveted externally of the section at each end thereof and also at each end of such section another right angled flanged attaching part with holes for rivets and bolts riveted internally of the section each right angled flanged attaching part and presenting only longitudinal bearing faces and having the two outer bounding faces at right angles for one to bear against the said section and the other to bear against a part for connection with such section, bolts passed through holes in said attaching parts and nuts thereon.

4. In a sheet metal self acting mule carriage, adjacent sections of the carriage, right angled flanged attaching parts each having holes for rivets and bolts riveted at each end of each of said sections and each presenting only longitudinal bearing faces and having the two outer bounding faces at right angles for one to bear against the section to which it is riveted and the other to bear against a part for connection with such section, a metal plate extending between the opposed faces at the adjacent ends of the two sections and on the attaching parts thereon, bolts passed through holes in the opposed attaching parts and the plate and nuts on such bolts.

5. In a sheet metal self acting mule carriage, adjacent sections of the carriage right angled flanged attaching parts, each having holes for rivets and bolts, riveted externally at each end of each of said sections and each presenting only longitudinal bearing faces and having the two outer bounding faces at right angles for one to bear against the section to which it is riveted and the other to bear against a part for connection with such section, a metal plate extending between the opposed faces at the ends of the two adjacent sections and on the attaching parts thereon, bolts passed through holes in the opposed attaching parts and the plate and nuts on such bolts.

6. In a sheet metal self acting mule carriage, adjacent sections of the carriage, a plurality of right angled flanged attaching parts with holes for rivets and bolts riveted, externally of each of such sections at each end thereof, and also at each end of such sections another right angled flanged attaching part with holes for rivets and bolts riveted internally of the section, each right angled flanged attaching part presenting only longitudinal bearing faces at right angles for one to bear against the section to which it is riveted and the other to bear against a part for connection with such section, a metal plate extending between the opposed faces at the adjacent ends of the two sections and on the attaching parts thereon, bolts passed through in the opposed attaching part and the plate aid nuts on such bolts.

7. In a sheet metal self acting mule carriage, a section of the carriage, right angled flanged attaching parts each having holes for bolts and rivets riveted at the ends of each section at the front and rear and presenting only longitudinal bearing faces and having the two outer bounding faces at right angles for one to bear against the said section and the other to bear against a part for connection with said section, bolts passed through such holes and nuts thereon.

8. In a sheet metal self acting mule carriage, a section of the carriage, right angled flanged metallic attaching parts each having holes for bolts and rivets riveted at the ends of each section at the front and rear and on the bottom and presenting only longitudinal bearing faces and having the two outer bounding faces at right angles for one to bear against the said section and the other to bear against a part for connection with said section, bolts passed through such holes and nuts thereon.

9. In a sheet metal self acting mule carriage, a section of the carriage, right angled flanged metallic attaching parts each having holes for bolts and rivets riveted at the ends of each section at the front and rear externally of the section and presenting only longitudinal bearing faces and having the two outer bounding faces at right angles for one to bear against the said section and the other to bear against a part for connection with said section, bolts passed through such holes and nuts thereon.

10. In a sheet metal self acting mule carriage, adjacent sections of the carriage, bolts joining the sections together and a metal plate made to extend between the opposed faces at the ends of sections to be joined together and secured in position by the bolts joining the sections together.

11. In a sheet metal self acting mule carriage, meeting sections, brackets riveted at the front and rear of the end of a section to be joined to another, an angle bar extending across the bottom between the inner surfaces of the front and back and riveted to the bottom, bolts passed through holes in the brackets and angle bars of the meeting sections and nuts on said bolts.

12. In a sheet metal self acting mule carriage, meeting sections, flanged brackets riveted at the front and rear of the end of a section to be joined to another, an angle bar extending across the bottom between the inner surfaces of the front and back and riveted to the bottom, a metal plate extending between the meeting faces of the said sections and the flanged brackets and angle bars thereon, bolts passed through holes in the brackets and angle bars on the meeting sections and through holes in the plate and nuts on such bolts.

13. In a sheet metal self acting mule carriage, meeting sections, flanged brackets riveted at the front and rear of the end of a section to be joined to another, an angle bar extending across the bottom between inner surfaces of the front and back and riveted to the bottom and having holes, a metal plate extending between the meeting faces of the sections and having holes, angle bars riveted to such plate along its upper edge at opposite sides and extending between the inner surfaces of the front and back walls of the sections and having holes, bolts passed through holes in the brackets and angle bars of the meeting sections and holes in the plate and nuts in such bolts.

14. In a sheet metal self acting mule carriage, a section to be joined to the square, flanged brackets riveted at the front and rear of the end of said section to be joined to the square and having holes, an angle bar extending across the bottom of said section between the inner surfaces of the front and back and riveted to the bottom and having holes and bolts in holes in corresponding places in the brackets and angle bar and the square and nuts on such bolts.

In testimony, that I claim the foregoing as my invention, I have signed my name this eighth day of February 1921.

HENRY PLATT HALL.